United States Patent
Wake et al.

(10) Patent No.: US 7,846,598 B2
(45) Date of Patent: Dec. 7, 2010

(54) FUEL CELL SYSTEM AND METHOD OF STOPPING OPERATION OF THE FUEL CELL SYSTEM

(75) Inventors: Chihiro Wake, Tochigi-ken (JP); Hibiki Saeki, Utsunomiya (JP); Tomoki Kobayashi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 1174 days.

(21) Appl. No.: 11/334,657

(22) Filed: Jan. 17, 2006

(65) Prior Publication Data

US 2006/0159966 A1 Jul. 20, 2006

(30) Foreign Application Priority Data

Jan. 18, 2005 (JP) ............................. 2005-010242

(51) Int. Cl.
*H01M 8/04* (2006.01)
(52) U.S. Cl. ...................................... 429/429; 429/512
(58) Field of Classification Search ............. 429/12–46, 429/400–535
See application file for complete search history.

(56) References Cited

U.S. PATENT DOCUMENTS 6,158,537 A * 12/2000 Nonobe ....................... 429/13

2004/0101724 A1 * 5/2004 Imamura et al. ............... 429/22
2004/0204874 A1 * 10/2004 Hasuka et al. ................ 702/60
2005/0106424 A1 * 5/2005 Elhamid et al. ................ 429/9

FOREIGN PATENT DOCUMENTS

JP 2003-331893 11/2003

OTHER PUBLICATIONS

Yoshida, A. et al., An Electric Double-Layer Capacitor with High Capacitance and Low Resistance, Feb. 1992, IEEE Transactions on Components, Hybrids, and Manufacturing Technology, vol. 15., No. 1, pp. 133-138.*

* cited by examiner

*Primary Examiner*—Patrick Ryan
*Assistant Examiner*—Jonathan G Leong
(74) *Attorney, Agent, or Firm*—Fish & Richardson P.C.

(57) ABSTRACT

When a power generation stop signal of an ignition switch is detected, an oxygen-containing gas is supplied to an anode for starting an anode scavenging process. After starting the anode scavenging process, the remaining electrical energy stored in a capacitor is monitored. If the monitored remaining electrical energy stored in the capacitor is decreased to a threshold, the anode scavenging process is finished. At the end of the anode scavenging process, the remaining electrical energy becomes equal to the threshold. By the remaining electrical energy equal to the threshold, the next operation of the fuel cell system is reliably started. Since the anode scavenging process continues until the remaining electrical energy is decreased to the threshold, the time for the anode scavenging process can be increased as much as possible.

12 Claims, 5 Drawing Sheets

FUEL CELL SYSTEM AND METHOD OF STOPPING OPERATION OF THE FUEL CELL SYSTEM

BACKGROUND OF THE INVENTION

1. Field of the Invention

The present invention relates to a fuel cell system including a fuel cell and an energy storage which is charged by the power generation current of the fuel cell, and assists the output of the fuel cell. Further, the present invention relates to a method of stopping operation of the fuel cell system. In particular, the present invention relates to a fuel cell system and a method of stopping operation of the fuel cell system in which when power generation of the fuel cell system is stopped, a scavenging process is performed for an anode system for starting operation of the fuel cell system at a low temperature, e.g., at a temperature below the freezing point.

2. Description of the Related Art

For example, a polymer electrolyte fuel cell employs a membrane electrode assembly which includes an anode (fuel electrode) and a cathode (air electrode), and a polymer electrolyte membrane interposed between the electrodes. The electrolyte membrane is an ion exchange membrane. The membrane electrode assembly is sandwiched between a pair of separators. A fuel gas flow field is formed between the anode and one of the separators, and an oxygen-containing gas flow field is formed between the cathode and the other of the separators. In use, normally, a predetermined numbers of the membrane electrode assemblies and separators are stacked together to form a fuel cell stack.

In the fuel cell, a fuel gas such as a hydrogen-containing gas is supplied to the fuel gas flow field. The fuel gas flows through the fuel gas flow field along the anode. The catalyst of the anode induces a chemical reaction of the fuel gas to split the hydrogen molecule into hydrogen ions and electrons. The hydrogen ions move toward the cathode through the suitably humidified electrolyte membrane, and the electrons flow through an external circuit to the cathode, creating a DC electrical energy. Further, in the fuel cell, an oxygen-containing gas such as the air is supplied to the oxygen-containing gas flow field, and the oxygen-containing gas flows along the cathode for reaction. At the cathode, hydrogen ions from the anode combine with the electrons and oxygen to produce water. The water is also retained at the anode due to the back diffusion from the cathode or high humidification of the fuel gas or the like.

If the water is excessively present at any of the electrodes, water clogging may occur. In view of the above, in the fuel cell system, a technique of the scavenging process for the anode (hereinafter also simply referred to as the "anode scavenging technique") as disclosed in Japanese Laid-Open Patent Publication No. 2003-331893 is proposed. In the anode scavenging technique, when the operation of the fuel cell system is started or finished, an oxygen-containing gas is supplied to the anode in addition to the cathode for removing the water produced in the power generation from the membrane electrode assembly or the separators of the fuel cell.

In order to perform the anode scavenging process, an energy source other than the fuel cell is required. Thus, in the fuel cell system, an energy storage such as a capacitor or a battery is mounted for assisting the output of the fuel cell.

The energy storage is also utilized as an energy source for starting operation of the fuel cell system in addition to the anode scavenging process.

However, after the fuel cell system is stopped, if it becomes necessary to start operation of the fuel cell system at a low temperature such as a temperature below the freezing point due to the decrease in the outside air temperature, it has been found that, in some cases, it becomes difficult to restart operation of the fuel cell system at a low temperature such as a temperature below the freeing point. For example, this is caused by the decrease in the remaining electrical energy stored in the energy storage since the energy is consumed in the anode scavenging process.

Further, it has been found that the degradation of the fuel cell is less likely to occur as the anode scavenging process is conducted for a longer period of time.

SUMMARY OF THE INVENTION

The present invention has been made taking the problems into consideration, and an object of the present invention is to provide a fuel cell system and a method of stopping operation of the fuel cell system in which the energy for starting the next operation of the fuel cell system is sufficient, and the time for the anode scavenging process is increased as much as possible.

In the fuel cell system and the method for stopping operation of the fuel cell system according to the present invention, when a power generation stop signal is detected, an oxygen-containing gas is supplied to an anode for starting a scavenging process. After starting the scavenging process, the remaining electrical energy stored in a capacitor is monitored. If the monitored remaining electrical energy stored in the capacitor is decreased to a threshold, the scavenging process is finished. Therefore, at the end of the scavenging process, the remaining electrical energy becomes equal to the threshold.

By the remaining electrical energy equal to the threshold, the next operation of the fuel cell system is started reliably. Since the scavenging process continues until the remaining electrical energy is decreased to the threshold, the time for the anode scavenging process can be increased as much as possible.

In this case, the temperature of the energy storage may be measured to calculate the remaining electrical energy using the measured temperature of the energy storage as a parameter, so that the desired remaining electrical energy corresponding to the temperature of the energy storage is achieved.

Further, when the power generation stop signal is detected, by continuing power generation of the fuel cell to charge the energy storage using the power generation current of the fuel cell, before starting the scavenging process, the time for the scavenging process becomes long.

As the energy storage, a capacitor or a battery may be used.

In the present invention, since the end of the anode scavenging process is determined based on the remaining electrical energy stored in the energy storage, the time for the anode scavenging process can be increased as much as possible, and it is possible to start the next operation of the fuel cell system reliably.

Thus, it is possible to reliably start the next operation of the fuel cell system at a low temperature, e.g., at a temperature below the freezing point.

The above and other objects, features and advantages of the present invention will become more apparent from the following description when taken in conjunction with the accompanying drawings in which a preferred embodiment of the present invention are shown by way of illustrative example.

DESCRIPTION OF THE PREFERRED EMBODIMENTS

Hereinafter, an embodiment of the present invention will be described with reference to the drawings.

Figure 1:
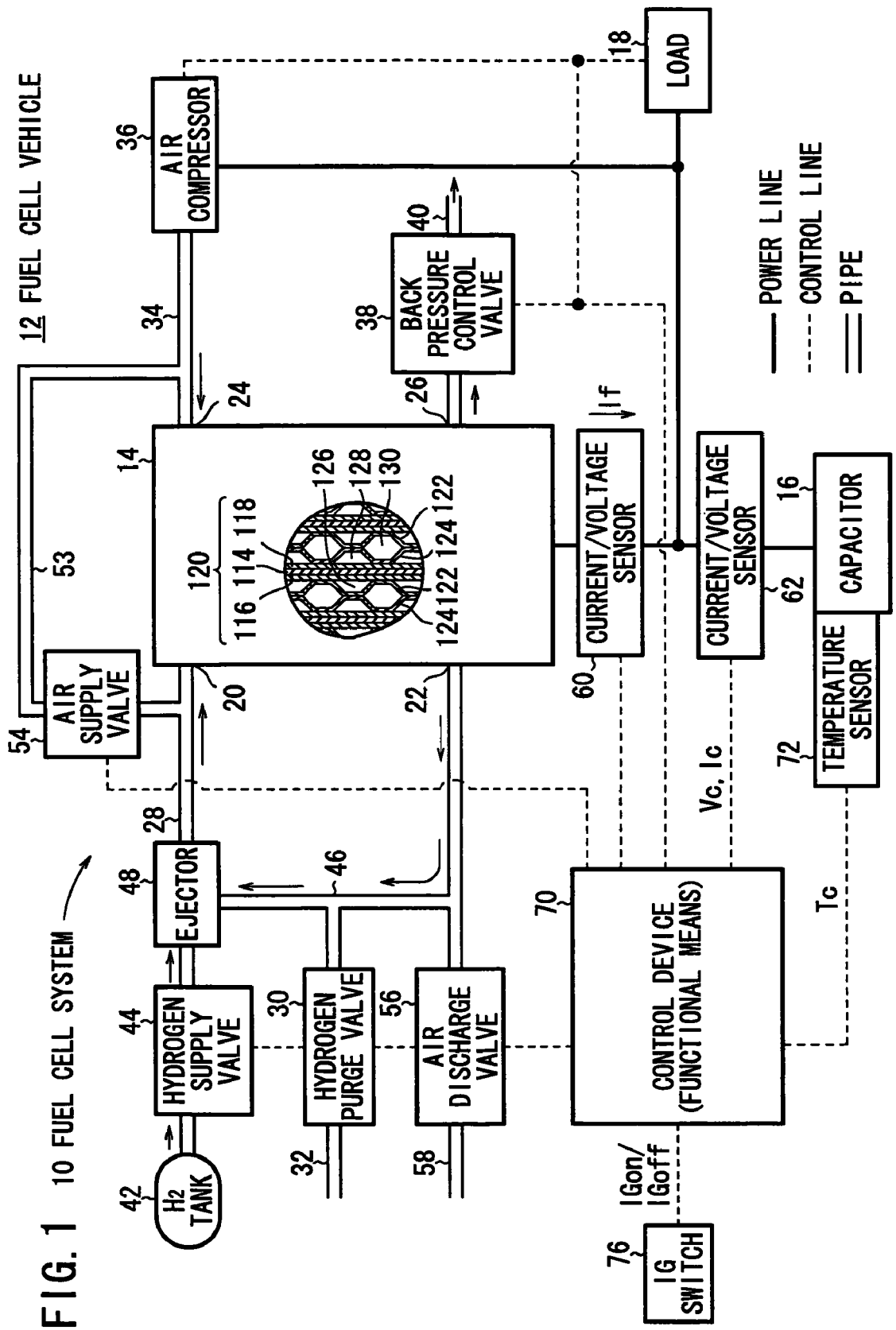
FIG. 1 is a diagram schematically showing structure of a fuel cell system according to an embodiment of the present invention.

FIG. 1 is a diagram schematically showing structure of a fuel cell vehicle 12 including a fuel cell system 10 according to the embodiment of the present invention.

Basically, the fuel cell vehicle 12 includes a fuel cell 14, and a capacitor 16 as an energy storage for assisting the output of the fuel cell 14, and a load 18 such as a drive motor for traveling and an auxiliary device (e.g., air conditioner, lamp). The capacitor 16 is charged by the power generation current If generated in the fuel cell 14. As the energy storage, for example, a battery may be used instead of the capacitor 16. Alternatively, both of the capacitor 16 and the battery may be used.

As the cross section of the fuel cell 14 is schematically shown in FIG. 1, the fuel cell 14 has stack structure formed by stacking a plurality of cells each including a membrane electrode assembly 120 and a pair of separators 122, 124 sandwiching the membrane electrode assembly 120. The membrane electrode assembly 120 includes an anode 116, a cathode 118, and an electrolyte (e.g., solid polymer electrolyte membrane) 114 interposed between the anode 116 and the cathode 118. A fuel gas flow field 126 is formed between the anode 116 and the separator 124, and an oxygen-containing gas flow field 128 is formed between the cathode 118 and the separator 122. Further, a coolant flow field 130 is formed between the separator 122 and the separator 124.

The fuel cell 14 has a hydrogen supply port 20 for supplying a fuel gas such as a hydrogen ($H_2$) gas to the anode 116 through the fuel gas flow field 126 in the fuel cell 14, a hydrogen discharge port 22 for discharging an exhaust gas from the fuel gas flow field 126 (the exhaust gas contains the hydrogen gas which has not been consumed in the power generation), an air supply port 24 for supplying an oxygen-containing gas such as the air containing oxygen ($O_2$) to the cathode 118 through the oxygen-containing gas flow field 128 in the fuel cell 14, and an air discharge port 26 for discharging the air containing unconsumed oxygen from the oxygen-containing gas flow field 128 in the fuel cell 14.

A hydrogen supply channel 28 is connected to the hydrogen supply port 20. An ejector 48 is provided in the hydrogen supply channel 28. A hydrogen tank 42 stores a high pressure hydrogen, and the hydrogen gas is supplied from the hydrogen tank 42 to the ejector 48 through a hydrogen supply valve 44. The ejector 48 supplies the hydrogen gas to the fuel cell 14 through the hydrogen supply channel 28 and the hydrogen supply port 20. Further, the ejector 48 sucks the exhaust gas containing the unconsumed hydrogen gas which has not been consumed in the fuel cell 14 such that the exhaust gas is discharged to a hydrogen circulation channel 46 connected to the hydrogen discharge port 22. The exhaust gas sucked by the ejector 48 is supplied again to the fuel cell 14.

A hydrogen purge valve 30 is provided in the hydrogen circulation channel 46. The hydrogen purge valve 30 is opened as necessary. When the hydrogen purge valve 30 is opened, water retained at the anode 116 and the fuel gas containing the nitrogen gas mixed into the anode 116 from the cathode 118 through the electrolyte membrane 114 is discharged to the outside through a hydrogen purge channel 32 and a dilution box (not shown). Thus, the power generation stability is achieved. Further, an air discharge valve 56 is provided in the hydrogen circulation channel 46. When the air discharge valve 56 is opened, the water retained at the anode 116 or the separator 122, or the residual fuel gas is discharged together with the air which has been supplied from the hydrogen supply port 20 through an air supply valve 54 into the fuel gas flow field 126 in the fuel cell 14 at the time of the scavenging process for the anode 116 (hereinafter referred to as the "anode scavenging process") performed when the fuel cell system 10 is stopped, from the hydrogen discharge port 22 to the outside through an air discharge channel 58.

The air discharge valve 56, the air supply valve 54, and the hydrogen purge valve 30 are ON/OFF valves.

An air supply channel 34 is connected to the air supply port 24. An air compressor 36 is connected to the air supply channel 34. The air compressor 36 includes a compressor motor for compressing the atmospheric air from the outside, and supplying the compressed air to the fuel cell 14.

Further, a back pressure control valve 38 is provided at the air discharge port 26. The back pressure control valve 38 regulates the pressure of the air supplied from the air compressor 36 to the oxygen-containing gas flow field 128 in the fuel cell 14 through the air supply channel 34 and the air supply port 24. The air discharge port 26 of the fuel cell 14 is connected to the outside through the back pressure control valve 38 and an air discharge channel 40.

Further, the air supply valve 54 is provided between the hydrogen supply channel 28 and the air supply channel 34 connected to the fuel cell 14. The air supply valve 54 is opened at the time of supplying the compressed air into the hydrogen supply port 20 through the air inlet channel 53, i.e., at the time of the anode scavenging process.

Further, in the fuel cell system 10, and the fuel cell vehicle 12 equipped with the fuel cell system 10, a control device 70 is provided. The control device 70 controls the entire operation of the fuel cell system 10 and the fuel cell vehicle 12.

The control device 70 comprises a computer, and operates as means for achieving various functions by executing programs stored in a memory based on various inputs. In the embodiment, for example, the control device 70 is operated as means for detecting a power generation stop signal, means for starting the scavenging process, means for monitoring the remaining electrical energy, and means for determining the end of the scavenging process. In FIG. 1, solid lines denote power lines, dotted lines denote signal lines such as a control line, and double lines denote pipes.

During normal power generation operation of the fuel cell system 10, by the valve control of the control device 70, basically, the hydrogen supply valve 44 is opened, and the back pressure control valve 38 is opened by the suitable degree. Though the hydrogen purge valve 30 is opened as necessary, normally, the hydrogen purge valve 30 is closed. Further, the air supply valve 54 and the air discharge valve 56 are closed.

During the normal power generation operation, the air (oxygen) is supplied from the air compressor 36 to the cathode 118 of the fuel cell 14, and the hydrogen gas is supplied from the high pressure hydrogen tank 42 to the anode 116. At the anode 116, the hydrogen is split into hydrogen ions and electrons. The hydrogen ions move toward the cathode 118 through the solid polymer electrolyte membrane 114. The electrons are collected as the power generation current If by an external circuit.

In this manner, during the normal power generation operation, the power generation current If collected from the fuel cell 14 is supplied through a current/voltage sensor 60 for the fuel cell 14 to the load (electrical load) 18 and a driving motor of the air compressor 36. Further, the power generation current If is also supplied to the capacitor 16 through a current/voltage sensor 62 for the capacitor 16. The remaining electrical energy stored in the capacitor 16 is regulated by the control device 70 based on the output of the current/voltage sensor 62, and data of the remaining electrical energy is stored in the memory.

For example, the capacitor 16 is an electric double layer capacitor. The capacitor 16 is charged by the power generation current If from the fuel cell 14 under the control of the control device 70, and assists the output of the fuel cell 14. When power generation of the fuel cell 14 is stopped, the electrical energy (electricity) stored in the capacitor 16 is supplied to the load 18 and the air compressor 36. Further, the electrical energy stored in the capacitor 16 is used as an energy source at the time of starting the operation of the fuel cell system 10 at a low temperature, such as a temperature below the freezing point. When the fuel cell vehicle 12 is decelerated, and the driving force is transmitted from the drive wheels to the drive motor as the load 18, the drive motor functions as a power generator, and generates the so called regenerative braking force. Thus, it is possible to collect kinetic energy of the vehicle body as electrical energy. From the load 18, regeneration of the electrical energy is performed, i.e., the electrical energy is stored in the capacitor 16.

During normal power generation operation, in the fuel cell vehicle 12 equipped with the fuel cell system 10, the control device 70 calculates the required electrical power based on the pedal position of an accelerator pedal (not shown) or the vehicle speed or the like. Based on the calculated required electrical power, the control device 70 implements various controls, i.e., sends control signals to the fuel cell 14, the load 18, the air compressor 36, and the back pressure control valve 38 or the like. Further, in order to reliably implement the control of the load 18, and the control at the time of starting the operation of the fuel cell system 10 at a low temperature such as a temperature below the freezing point, the control device 70 retrieves signals indicating the power generation current If, the current flowing into the capacitor 16, the voltage (capacitor voltage) Vc of the capacitor 16, and the temperature (capacitor temperature) Tc of the capacitor 16, from the current/voltage sensors 60, 62, and a temperature sensor 72 of the capacitor 16 as means for detecting the temperature of the energy storage. Based on the signals, the control device 70 keeps track of the remaining electrical energy and the required remaining electrical energy stored in the capacitor 16.

Further, an ignition switch (IG switch) 76 is connected to the control device 70. The ignition switch 76 outputs a start-up signal IGon (signal for starting operation) and a power generation stop signal IGoff (signal for changing the ON state to the OFF state, and keeping the OFF state) for the fuel cell vehicle 12 and the fuel cell system 10.

Figure 2:
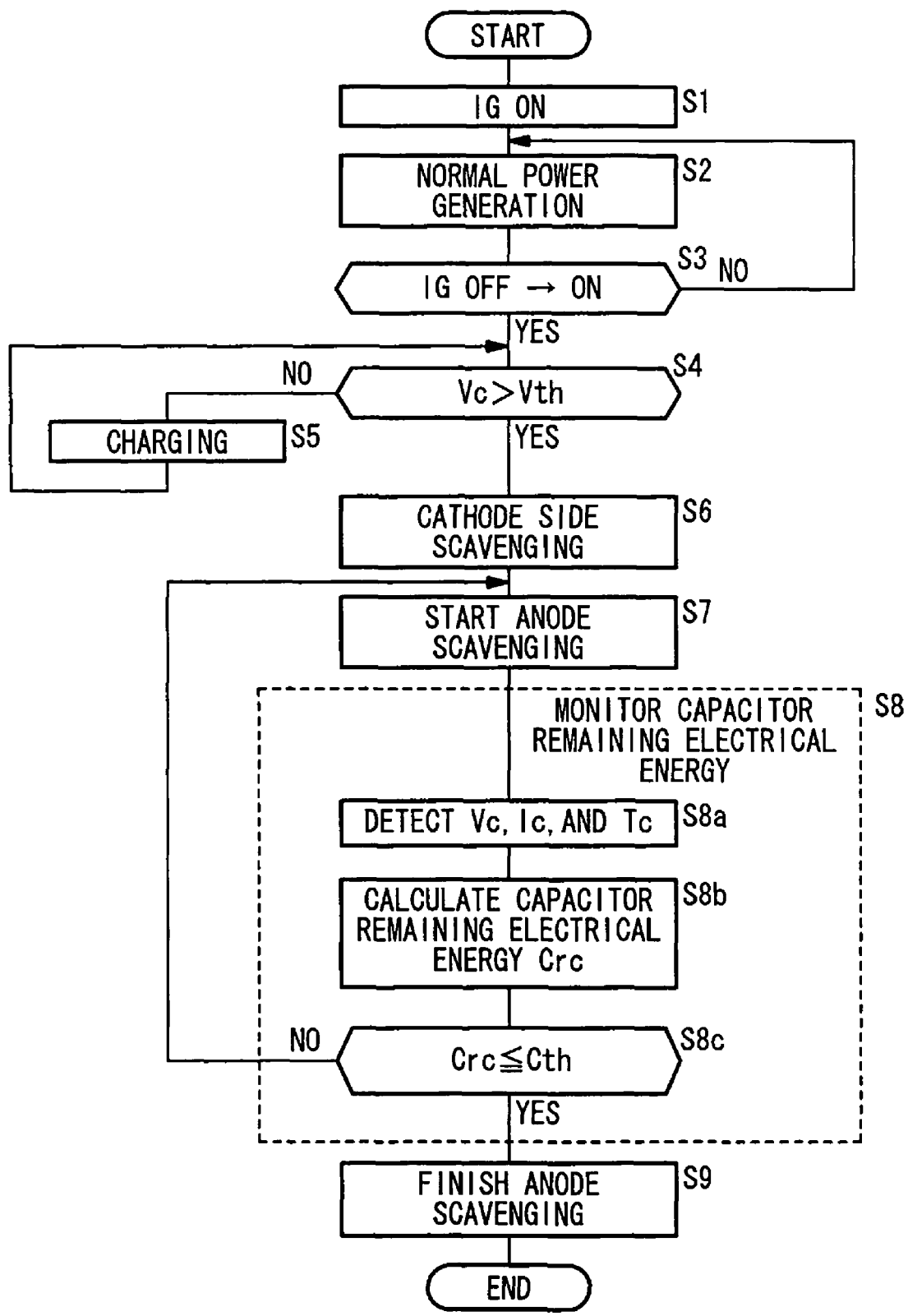
FIG. 2 is a flow chart illustrating a process of monitoring the remaining electrical energy stored in a capacitor or the like when an ignition switch is turned off.
Figure 3:
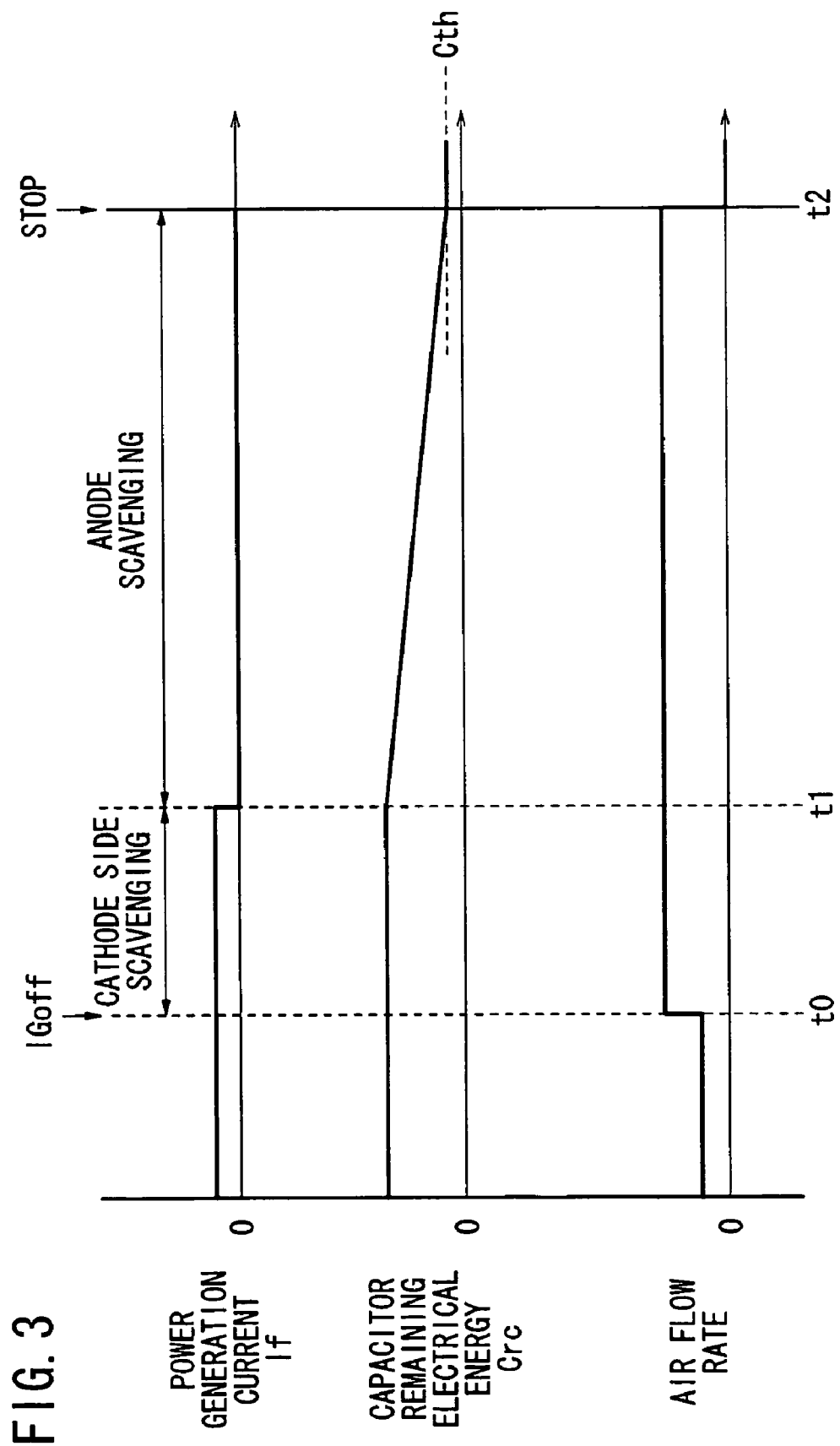
FIG. 3 is a time chart illustrating the process of monitoring the remaining electrical energy stored in the capacitor or the like when the ignition switch is turned off.

The basic structure and operation of the fuel cell system 10 and the fuel cell vehicle 12 equipped with the fuel cell system 10 have been described above. Next, operation of the fuel cell system 10 will be described with reference to a flow chart in FIG. 2 and a time chart in FIG. 3.

In step S1, when the control device 70 detects a start-up signal IGon of the ignition switch 76 as a signal for starting operation of the fuel cell system 10, in step S2, the above-described normal power generation operation of the fuel cell 14 is performed.

Then, in step S3, it is determined whether the ignition switch 76 has been switched from the ON state to the OFF state based on the presence of a power generation stop signal IGoff.

If it is determined that the ignition switch 76 remains in the ON state in step S3, the normal power generation operation in step S2 continues. If it is determined that the ignition switch 76 has been switched from the ON state to the OFF state as shown at the time t0, and the power generation stop signal IGoff is detected, the system stop process is started.

In the system stop process, firstly, in step S4, it is determined whether the capacitor voltage Vc at the present time is greater than a predetermined threshold Vth. If it is determined that the capacitor voltage Vc is not greater than the predetermined threshold Vth, in step S5, charging of the capacitor 16 is performed until the capacitor voltage Vc reaches the voltage threshold Vth.

In order to supply the sum of the energy required for starting the next operation of the fuel cell 14 at a temperature below the freezing point and the energy required for performing the anode scavenging process for predetermined time in the subsequent steps, the voltage threshold Vth is determined to have a value corresponding to the combined energy represented by {electrostatic capacitance of the capacitor 16× $(Vth)^2/2$}. For example, in comparison with the case of the normal temperature of 20 [° C.], at the temperature below the freezing point, the value of the electrostatic capacitance tends to be low. Therefore, when the ignition switch 76 is placed in the OFF state, the capacitor temperature Tc is measured by the temperature sensor 72. In correspondence with the capacitor temperature Tc, for example, at the temperature below the freezing point, the voltage threshold Vth may be switched (changed) to have a voltage value corresponding to the nominal electrostatic capacitance at the normal temperature.

In practice, the charging process in step S5 is not required if the normal power generation in step S2 continues for predetermined time or more. In this case, the capacitor 16 is sufficiently charged, and the determination in step S4 becomes YES (the time for the charging process is omitted in the time chart of FIG. 3).

In step S4, if it is determined that the capacitor voltage Vc is greater than the voltage threshold Vth, in step S6, a scavenging process for only the cathode (hereinafter referred to as the "cathode side scavenging process") is performed for a period from the time t0 to the time t1.

In the cathode side scavenging process, after the time t0, under the control of the control device 70, the flow rate of the air supplied from the air compressor 36 to the cathode 118 in the fuel cell 14 through the air supply port 24 is increased. Thus, water or the like retained at the cathode 118 of the fuel cell 14, the oxygen-containing gas flow field 128, and the separator 124 is blown away, and discharged to the outside through the air discharge port 26, the back pressure control valve 38, and the air discharge channel 40.

If the determination in step S4 is YES, the hydrogen supply valve 44 is closed. However, in the period of the cathode side scavenging process from the time t0 to t1, by the hydrogen remaining in the fuel gas flow field 126 in the fuel cell 14 and the oxygen-containing gas supplied into the fuel cell 14, the power generation continues. It is possible to operate the auxiliary devices such as the air compressor 36 by the power generation current If. Therefore, the remaining electrical energy Crc stored in the capacitor 16 does not change.

Next, at the time t1 in step S7, the anode scavenging process is started. In the period of the anode scavenging process, in order to supply the compressed air from the air compressor 36 driven by the electric power by the capacitor 16 additionally into the anode 116, firstly, the air supply valve 54 provided in the air inlet channel 53 is opened, and the compressed air is supplied to the anode 116 and the cathode 118 from both of the hydrogen supply port 20 and the air supply port 24. The compressed air flows through the fuel gas flow field 126 and the oxygen-containing gas flow field 128 in the fuel cell 14. Then, the compressed air is discharged from the hydrogen discharge port 22 and the air discharge port 26, respectively. At this time, the hydrogen purge valve 30 is opened for certain time. After the hydrogen purge is performed, the hydrogen purge valve 30 is closed. Then, the air discharge valve 56 is opened. By the supplied scavenging air, the water retained at the membrane electrode assembly 120 or the separators 122, 124 of the fuel cell 14 is removed reliably. In this case, the scavenging process for the cathode 118 continues. On the anode side, the water retained in the fuel cell 14 is discharged together with the scavenging air from the hydrogen discharge port 22 to the outside through the air discharge valve 56 and the air discharge channel 58.

During the anode scavenging process, in steps S8 (S8a to S8c) for monitoring the remaining electrical energy (capacitor remaining electrical energy) Crc stored in the capacitor 16, the capacitor remaining electrical energy Crc is monitored continuously at predetermined intervals of time, and calculated by the control device 70. Then, it is determined whether the calculated capacitor remaining electrical energy Crc is not more than a predetermined remaining electrical energy threshold Cth corresponding to the energy required for starting the next operation of the fuel cell 14 at a temperature below the freezing point.

Specifically, in step S8a, the voltage Vc [V] of the capacitor 16 and the current Ic [A] of the capacitor 16 are detected by the control device 70 using the current/voltage sensor 62. Further, the temperature Tc [° C.] of the capacitor 16 is detected by the temperature sensor 72.

Then, in step S8b, the remaining electrical energy Crc stored in the capacitor 16 is calculated by the following expression (1).

Figure 4:
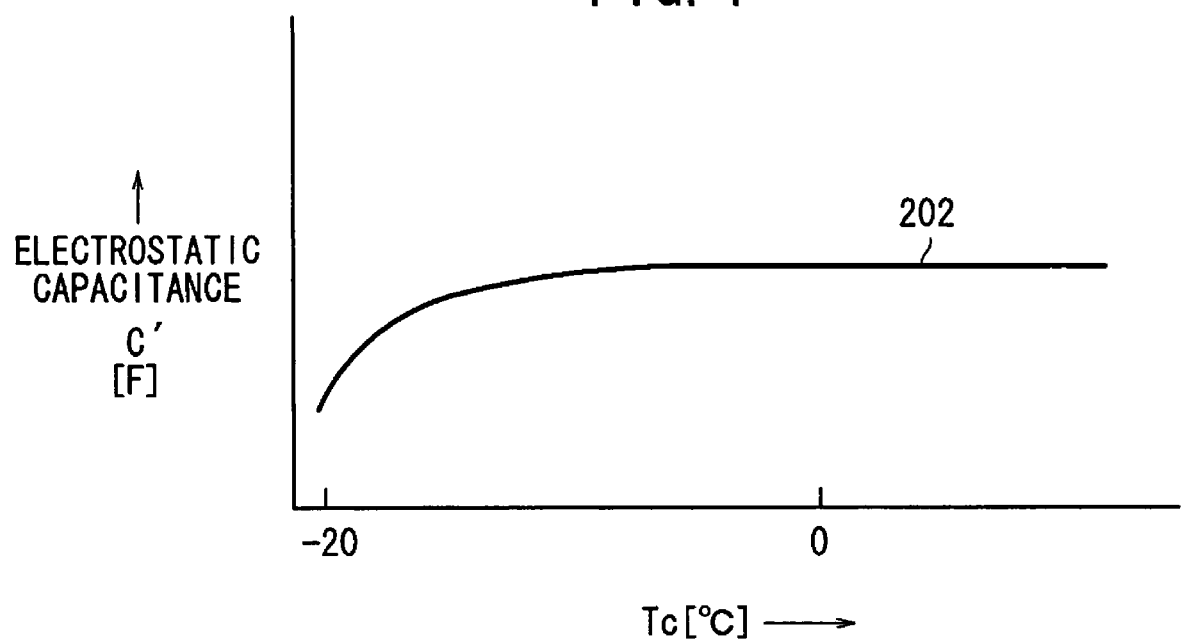
FIG. 4 is a graph showing a temperature-dependent characteristic curve of the electrostatic capacitance of the capacitor.
Figure 5:
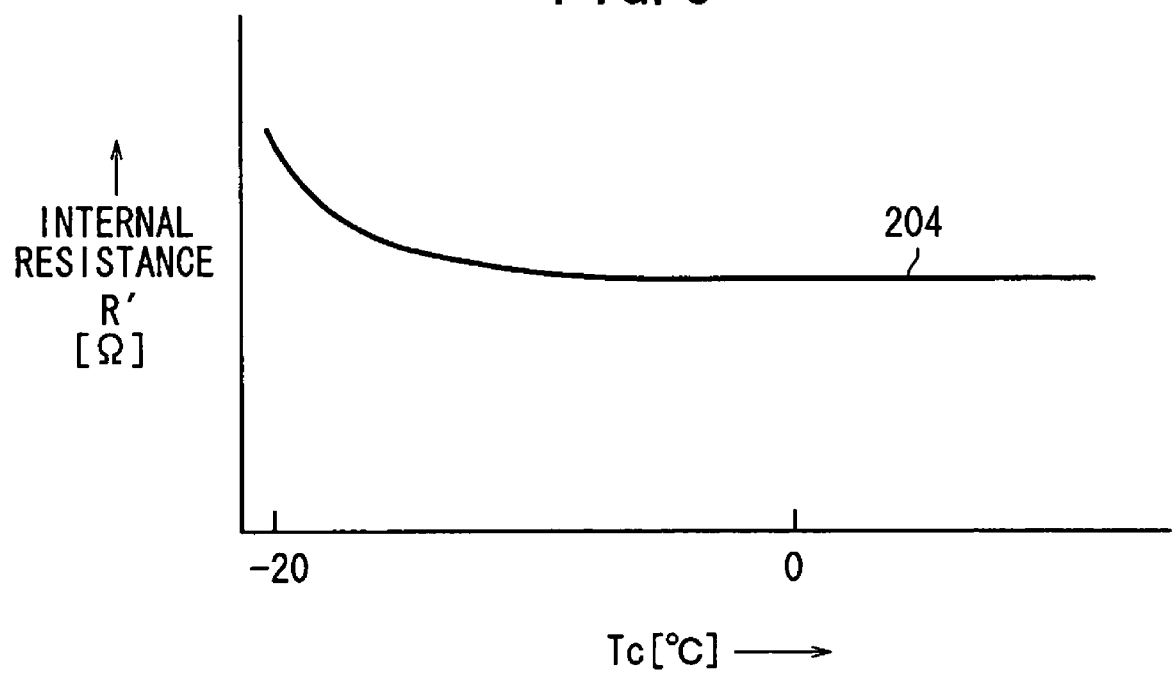
FIG. 5 is a graph showing a temperature-dependent characteristic curve of the internal resistance of the capacitor.

In this case, as shown by a characteristic curve 202 in FIG. 4, the electrostatic capacitance (capacitance value) C' [F] of the capacitor 16 decreases as the capacitor temperature Tc decreases, in particular, when the temperature thereof decreases below the freezing point of 0 [° C.]. As shown by a characteristic curve 204 in FIG. 5, the internal resistance R' [Ω] of the capacitor 16 increases as the capacitor temperature Tc decreases, in particular, when the temperature thereof decreases below the freezing point of 0 [° C.].

The control device 70 refers to the characteristic curves (maps) 202, 204 stored in the memory, and determines the electrostatic capacitance C' and the internal resistance R' corresponding to the parameter of the present capacitor temperature Tc.

At this time, the capacitor remaining electrical energy Crc is calculated by the following expression (1).

$$Crc = (1/2) \times C' \times (Vc - Ic \times R')^2 \quad (1)$$

Then, in step S8c, determination in the following expression (2) is made.

$$Crc \leq Cth \quad (2)$$

Until the condition of the expression (2) is met, i.e., if the present capacitor remaining electrical energy Crc is greater than the remaining electrical energy threshold Cth (Crc>Cth), the anode scavenging process in step S7 continues. As described above, degradation of the fuel cell 14 is less likely to occur, as the time for the anode scavenging process gets longer.

In this manner, when the determination in step S8c is YES, i.e., when the condition of the expression (2) (equal sign in the expression (2)) is met, in step S9, the anode scavenging process is finished. At the time t2 when the anode scavenging process is finished, operation of the air compressor 36 is stopped. At this time, normal close valves 54, 56, 30, 38 are closed (normal close valve is a valve which is closed when no electricity is supplied to the valve). The normal close hydrogen supply valve 44 has already been closed at the time t0, and the normal close hydrogen purge valve 30 is closed immediately after the time t1. Thus, the fuel cell system stop process is finished.

In the above-described embodiment, when a power generation stop signal IGoff generated at the time the ignition switch 76 is switched from the ON state to the OFF state is detected, the cathode side scavenging process is started. Then, the scavenging process for the anode 116 is also started by supplying the oxygen-containing gas to the anode 116. After starting the anode scavenging process, the remaining electrical energy Crc stored in the capacitor 16 is monitored. When the monitored remaining electrical energy Crc is decreased to the threshold Cth, the anode scavenging process is finished. Thus, at the time of finishing the anode scavenging process, the remaining electrical energy Crc becomes equal to the threshold Cth (Crc=Cth).

By the remaining electrical energy Crc equal to the threshold Cth, it is possible to reliably start the next operation of the fuel cell system 10 at a low temperature, i.e., at a temperature below the freezing point. Further, since no counter means such as a timer is used for the anode scavenging process, and the anode scavenging process is performed until the capacitor remaining electrical energy Crc is decreased to the threshold Cth, the time for the anode scavenging process becomes the maximum, and degradation of the fuel cell 14 is suppressed as much as possible.

During the anode scavenging process, the capacitor temperature Tc is measured, and the measured capacitor temperature Tc is used as a parameter for calculating the remaining electrical energy Crc by the expression (1). Therefore, the desired capacitor remaining electrical energy Crc corresponding to the temperature Tc of the capacitor 16 is achieved.

When a power generation stop signal IGoff is detected, the voltage Vc of the capacitor 16 is measured to determine whether the measured voltage Vc is greater than the voltage threshold Vth. If the voltage Vc is the voltage threshold Vth or less (Vc≦Vth), before starting the cathode side scavenging process and the anode scavenging process, by continuing the power generation of the fuel cell 14 under control for charging the capacitor 16 with the power generation current If of the fuel cell 14 to the voltage threshold Vth, it is possible to increase the time for the anode scavenging process.

In the above-described embodiment, the capacitor 16 is used as an energy storage. Alternatively, a battery may be used instead of the capacitor 16. In the case of using the battery, the remaining electrical energy is determined by monitoring the SOC (state of charge).

As described above, in the embodiment, the end of the anode scavenging process is determined based on the remaining electrical energy Crc stored in the capacitor 16. Therefore, it is possible to increase the time for the anode scavenging process. Further, by the remaining electrical energy Crc after the anode scavenging process, the next operation of the fuel cell system 10 is started reliably. It is possible to reliably start the operation of the fuel cell system 10 at a low temperature, e.g., at a temperature below the freeing point. Further, degradation of the fuel cell 14 is minimized.

While the invention has been particularly shown and described with reference to a preferred embodiment, it will be understood that variations and modifications can be effected thereto by those skilled in the art without departing from the spirit and scope of the invention as defined by the appended claims.

What is claimed is:

1. A method of stopping operation of a fuel cell system, said fuel cell system comprising a fuel cell operated for power generation by reaction of a fuel gas supplied to an anode and an oxygen-containing gas supplied to a cathode, and an energy storage for assisting the output of said fuel cell, said method comprising the steps of:
   detecting a power generation stop signal;
   determining whether said energy storage stores energy of a sum of energy required for starting a next operation of the fuel cell system and energy required for performing a scavenging process of said anode when said power generation stop signal is detected;
   continuing said power generation of said fuel cell to charge said energy storage if said energy storage does not store the energy of the sum of the energy required;
   starting a scavenging process by supplying the oxygen-containing gas to said anode if said energy storage stores the energy of the sum of the energy required;
   monitoring the remaining electrical energy stored in said energy storage after starting said scavenging process; and
   finishing said scavenging process when the monitored remaining electrical energy is decreased to a remaining electrical energy threshold that is sufficient for start-up of the fuel cell at a next start-up operation.

2. A method according to claim 1, further comprising the step of measuring a temperature of said energy storage before monitoring the remaining electrical energy stored in said energy storage, wherein in the step of monitoring the remaining electrical energy stored in said energy storage, the measured temperature of said energy storage is used as a parameter for calculating the remaining electrical energy.

3. A method according to claim 2, wherein said energy storage is a capacitor, and the temperature of said energy storage is used as a parameter for estimating the electrostatic capacitance and the internal resistance of said capacitor to calculate the remaining electrical energy.

4. A method according to claim 1 wherein determining whether the energy storage stores the energy of the sum of the energy required includes comparing a voltage of the energy storage with a predetermined threshold voltage, and if the voltage of the energy storage is equal to or smaller than the predetermined threshold voltage, then it is determined that the energy storage does not store the energy of the sum of the energy required, and if the voltage of the energy storage is greater than the predetermined threshold voltage, then it is determined that the energy storage stores the energy of the sum of the energy required.

5. A method according to claim 4 comprising measuring a temperature of the energy storage before determining whether the energy storage stores the energy of the sum of the energy required,
   wherein when the measured temperature is equal to or lower than a predetermined temperature, the predetermined voltage threshold is switched to have a voltage value greater than the predetermined voltage threshold.

6. A method according to claim 1 comprising performing the following steps after determining whether the energy storage stores the energy of the sum of the energy required and before starting the scavenging process of the anode:
   supplying the oxygen-containing gas to the cathode to start a scavenging process of the cathode, and
   performing the cathode scavenging process for a period with a power generation current from the fuel cell to continue power generation with the fuel cell gas remaining therein and the oxygen-containing gas supplied thereto.

7. A fuel cell system comprising:
   a fuel cell operated for power generation by reaction of a fuel gas supplied to an anode and an oxygen-containing gas supplied to a cathode;
   an energy storage for assisting the output of said fuel cell;
   means for detecting a power generation stop signal;
   means for determining whether said energy storage stores energy of a sum of energy required for starting a next operation of the fuel cell system and energy required for performing a scavenging process of said anode when said power generation stop signal is detected;
   means for continuing said power generation of said fuel cell to charge said energy storage if said energy storage does not store the energy of the sum of the energy required;
   means for starting a scavenging process by supplying the oxygen-containing gas to said anode if said energy storage stores the energy of the sum of the energy required;
   means for monitoring the remaining electrical energy stored in said energy storage after starting said scavenging process; and
   means for finishing said scavenging process when the monitored remaining electrical energy is decreased to a remaining electrical energy threshold that is sufficient for start-up of the fuel cell at a next start-up operation.

8. A fuel cell system according to claim 7, further comprising means for measuring a temperature of said energy storage before monitoring the remaining electrical energy stored in said energy storage, wherein said means for monitoring the remaining electrical energy stored in said energy storage uses the measured temperature of said energy storage as a parameter for calculating the remaining electrical energy.

9. A fuel cell system claim 8, wherein said energy storage is a capacitor, and the temperature of said energy storage is used as a parameter for estimating the electrostatic capacitance and the internal resistance of said capacitor to calculate the remaining electrical energy.

10. A fuel cell system according to claim 7 wherein the means for determining determines whether the energy storage stores the energy of the sum of the energy required by comparing a voltage of the energy storage with a predetermined threshold voltage, and if the voltage of the energy storage is equal to or smaller than the predetermined threshold voltage, then it is determined that the energy storage does not store the energy of the sum of the energy required, and if the voltage of the energy storage is greater than the predetermined threshold voltage, then it is determined that the energy storage stores the energy of the sum of the energy required.

11. A fuel cell system according to claim 10 comprising means for measuring a temperature of the energy storage before the means for determining determines whether the energy storage stores the energy of the sum of the energy required, wherein when the measured temperature is equal to or lower than a predetermined temperature, the predetermined voltage threshold is switched to have a voltage value greater than the predetermined voltage threshold.

12. A fuel cell system according to claim 7 further comprising:

means for supplying the oxygen-containing gas to the cathode to start a scavenging process of the cathode after the means for determining determines whether the energy storage stores the energy of the sum of the energy required and before the means for starting starts the scavenging process of the anode, and means for performing the cathode scavenging process for a period with a power generation current from the fuel cell to continue power generation with the fuel cell gas remaining therein and the oxygen-containing gas supplied thereto.

* * * * *